Figure 1:
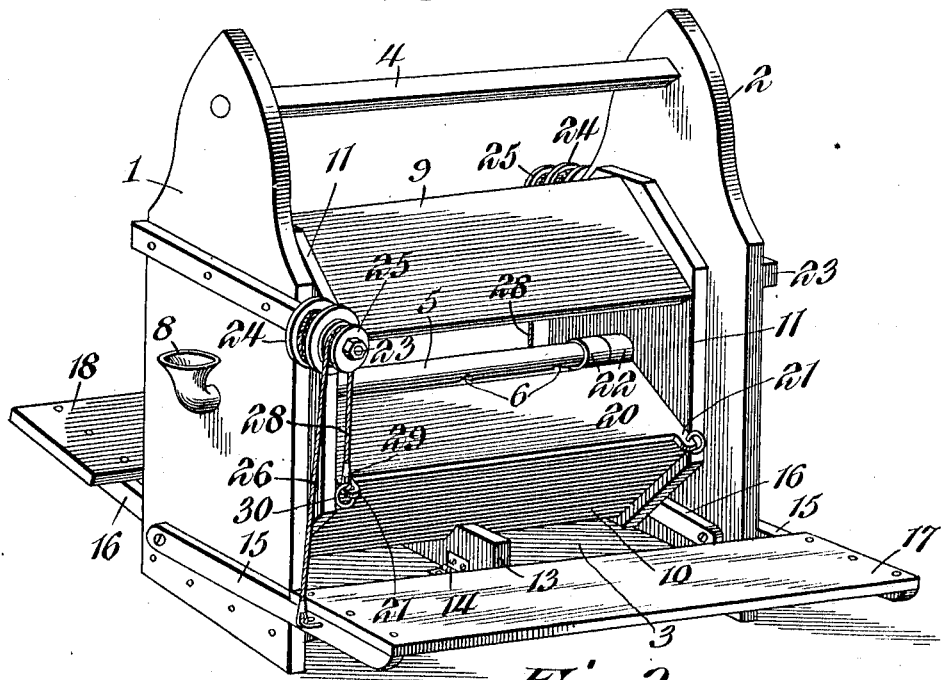

J. D. SMITH.
SANITARY DRINKING TROUGH.
APPLICATION FILED SEPT. 24, 1912.

1,054,463.

Patented Feb. 25, 1913.
2 SHEETS—SHEET 1.

WITNESSES
Howard D. Orr
F. T. Chapman

James D. Smith, INVENTOR,
BY E. G. Siggers
ATTORNEY

J. D. SMITH.
SANITARY DRINKING TROUGH.
APPLICATION FILED SEPT. 24, 1912.
1,054,463.
Patented Feb. 25, 1913.
2 SHEETS—SHEET 2.
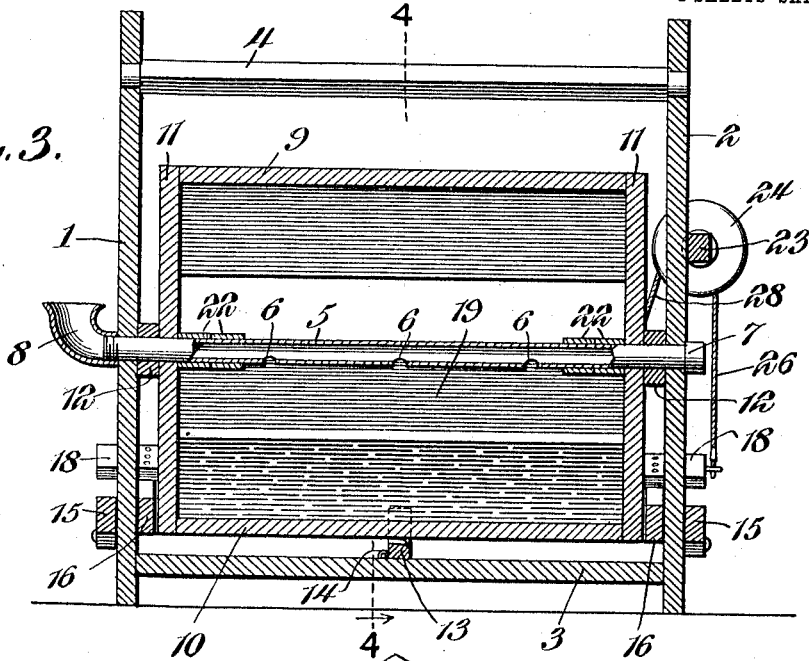
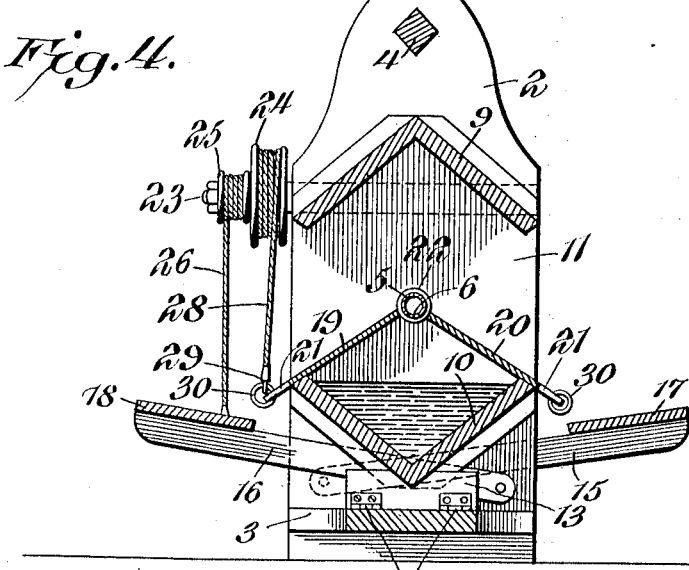
WITNESSES
Howard D. Orr.
F. T. Chapman.
James D. Smith, INVENTOR,
BY
E. G. Siggers
ATTORNEY

UNITED STATES PATENT OFFICE.

JAMES D. SMITH, OF ORLAND, CALIFORNIA.

SANITARY DRINKING-TROUGH.

1,054,463.  Specification of Letters Patent.  Patented Feb. 25, 1913.

Application filed September 24, 1912. Serial No. 722,148.

*To all whom it may concern:*

Be it known that I, JAMES D. SMITH, a citizen of the United States, residing at Orland, in the county of Glenn and State of California, have invented a new and useful Sanitary Drinking-Trough, of which the following is a specification.

This invention has reference to improvements in drinking troughs and is designed more particularly to provide a drinking trough which may be used in connection with poultry raising, but which may have a greater extent of use.

In accordance with the present invention there is provided a duplex drinking trough structure capable of rotation upon a central axis in such manner that when one trough is in service the other trough is inverted over the first trough, but spaced therefrom a sufficient distance to admit of the use of the trough in service. Cover members are provided and tiltable platforms are also provided with connections between the platforms and cover members of the trough so arranged that under conditions of use the cover members will gravitate into covering relation to the trough in service, but when the fowl steps upon the platform the weight of the fowl is sufficient to cause the platform to drop for a short distance and the connections between the platform and adjacent cover member are such that the cover member is lifted sufficiently to permit the fowl to have access to water within the trough. The structure may be so arranged that the trough may be approached from either side and separate covers are arranged so that but one cover is lifted from a platform. Provision is made for filling the trough without disturbing the cover members and the single set of cover members may be employed in connection with either trough which may at the time be in service.

By means of the present invention water may be preserved uncontaminated and before the drinking trough becomes sour or befouled the unused trough may be brought into service and the one that has been used may be elevated out of service to then become dry and thoroughly sterilized by the action of the atmosphere.

The invention will be best understood from a consideration of the following detailed description taken in connection with the accompanying drawings forming a part of this specification, with the further understanding that while the drawings illustrate a practical form of the invention it is susceptible of other practical forms, wherefore it is not confined to any strict conformity with the showing of the drawings but may be changed and modified so long as such changes and modifications mark no material departure from the salient features of the invention.

Figure 2:
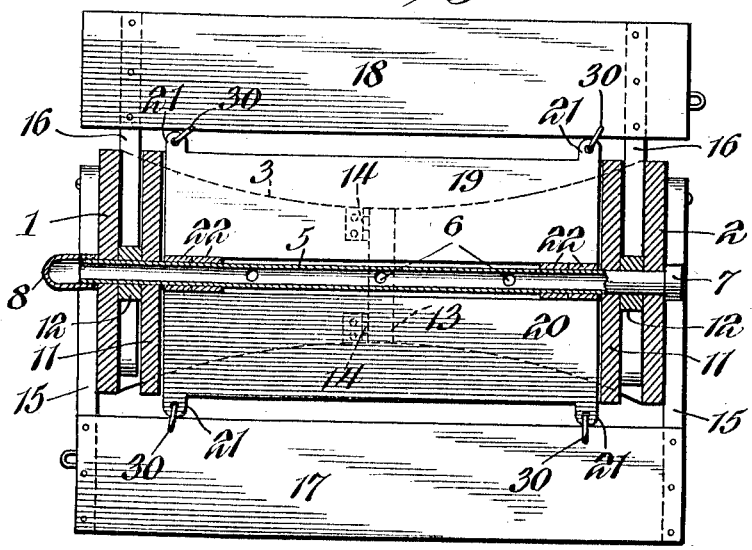

In the drawings:—Figure 1 is a perspective view of a drinking trough constructed in accordance with the present invention. Fig. 2 is a horizontal section in substantially the plane of the axis of rotation of the drinking trough. Fig. 3 is a central vertical section through the drinking trough with some parts in elevation. Fig. 4 is a section on the line 4—4 of Fig. 3.

In the drawings there is shown a frame structure composed of two end members 1, 2, a bottom member 3 connected to the end members at a distance above their lower ends, so that the end members will rest upon a suitable support with the bottom member slightly elevated, and at the top the end members are connected by a bar 4, which may be of prismatic shape to present a sharp edge along the upper portion, thereby preventing fowls from roosting thereon. The frame may be of any suitable configuration, and the side and bottom members may be suitably curved, as may be found desirable for ornamental purposes.

Traversing the side members 1 and 2 about midway of their height is a hollow shaft 5 preferably fixed in the side members, and this shaft or journal support has at suitable intermediate points perforations 6. One end of the shaft may be closed by a cap 7 while the other end outside the corresponding end member of the frame is provided with a funnel 8.

Mounted on the shaft are two troughs 9, 10, respectively, bounded at the ends by end pieces 11 which may also constitute the ends of the troughs, it being customary to form the troughs in V-shape with the legs of the V quite widely divergent. The end members 11 are traversed by the shaft 5, so as to readily turn on the shaft and the width of the troughs and end members 11 may be such as to be readily accommodated between the frame members 1 and 2. For purposes which will hereinafter appear the end members 11 are spaced from the end members 1 and 2 by spacing blocks 12. The trough may be rotated at any time desired about the supporting shaft or pivot 5, so that one of the troughs, say the trough 10, is at the time lowermost and the other trough is uppermost, and in overriding relation to the trough 10 and also inverted. Under these conditions water may be introduced into the trough 10 through the funnel 8 and hollow shaft 5, finding its way into the trough through the perforations 6, while the other trough is elevated and inverted, and if it has been in use will in this position readily drain and dry out, so that after remaining in the inverted position for a comparatively short period of time it becomes thoroughly sterilized and when the trough in use shall have been used for an appropriate length of time any souring or other contamination of the water in the trough may be prevented by the simple expedient of turning the troughs over to bring the trough 9 into use and permit the trough 10 to drain and dry. To hold the troughs in the inverted position a stop block 13 is secured to the bottom member 3 by hinges 14 and this block may be notched so as to fit the angle of the V trough to hold the pivoted or revoluble troughs in the desired position. When the troughs are to be revolved the block 13 is turned on the hinges 14 until out of the path of the troughs and the revolving of the troughs may be performed, and when the second trough is brought into position it may be locked therein by again moving the block 13 to the locking position.

Arms 15, 16 are pivoted to the side members 1 and 2 on respectively outer and inner faces thereof and project beyond the edges of these side members. The arms 15 may be pivoted to the members 1 and 2 exterior thereto and the arms 16 may be pivoted to the members 1 and 2 interior thereto. The arms 15 carry a platform 17 and the arms 16 which are arranged to project oppositely from the arms 15 carry a platform 18. These platforms are supported within operative distance of a trough 9 or 10 then in use, so that a fowl standing on either platform will be at a suitable height to reach water within the trough then in use. The platforms might be omitted and the troughs be so arranged as to be readily reached by the fowls without the aid of the platforms, but it is desirable that the trough in use be covered from possible exterior contamination, wherefore cover members 19, 20 are provided, each pivoted at one edge upon the shaft or hollow pivot rod 5 and of a length to engage against a respective edge of the trough in use. Each cover member 19 and 20 has at the corners ears 21, while at the edges where engaging the shaft 5 each cover member is provided with sleeves 22 encircling the shaft in pivotal relation thereto.

Each side members 1 and 2 carries a spindle 23, one spindle projecting oppositely with relation to the other. Mounted on these spindles are double pulleys 24, 25 joined together for simultaneous rotation. Wound upon one pulley 25 is a cord 26 in turn connected to one of the arms 15 for actuation thereby, while wound upon the other pulley 25 is a cord 26 connected to one of the arms 16 for actuation thereby. Wound upon each pulley 24 is a cord 28 terminating at the free end in a snap catch 29 adapted to be made fast to a respective ear 21 either directly or through the intermediary of a ring 30. The pulleys 24 are of larger diameter than the pulleys 25 so that a movement of a platform 17 or 18 will cause a greater movement of a cover member 19 or 20 and in practice but little movement of a platform under the weight of a fowl is necessary to effect the full raising of the cover 19 or 20 as the case may be. The parts are so arranged that the weight of the cover member 19 or 20 is sufficient to overcome the weight of the platform 17 or 18 and parts connected thereto, so that in the absence of a fowl upon the platform the cover members 19 and 20 will normally gravitate to the closed position. If, now, a fowl steps upon either platform the cord connections to the pulleys will cause the rotation of the pulleys and the lifting of the respective cover member 19 or 20 of an appropriate height. When it is desirable to change the troughs by rotating the rotatable trough structure, the cords 28 are disconnected from the respective covers and then when the trough structure is inverted these cover members will rest upon the trough newly brought into service, after which the cords 28 are connected and the structure is ready for use, water being introduced as before through the funnel 8 and may be renewed from time to time as found necessary.

It will be understood, of course, that the connected troughs alone without the frame or the covers and actuating means therefor could be employed, thus providing a clean, dry trough for immediate use whenever the trough in use shall have become soured or otherwise unfit for further use.

What is claimed is:—

1. A drinking trough structure provided with separated troughs with the open side of one trough facing the open side of the other to have one trough inverted and above the other while the latter is in use.

2. A drinking trough structure comprising a supporting frame, and a trough structure mounted therein for rotation about a central axis, said trough structure having drinking troughs on opposite sides of the axis with the open side of one trough facing the open side of the other to bring one of the troughs in overriding elevated relation to the other trough when the latter is in use.

3. A drinking trough structure comprising a supporting frame, and a trough structure mounted therein for rotation about a central axis, said trough structure having drinking troughs on opposite sides of the axis with the open side of one trough facing the open side of the other to bring one of the troughs in overriding elevated relation to the other trough when the latter is in use, and cover members for the troughs between and common to both troughs and active only to the trough in use.

4. A drinking trough structure comprising a supporting frame, a pair of troughs mounted for rotation therein and arranged one opposite the other with relation to the axis of rotation to bring the lower trough in position for service, cover members pivotally supported in the axis of rotation of the trough members in position to cover the trough in service, movable platforms exterior to the trough support and connections between the platforms and the cover members to cause the lifting of the cover members on the lowering of the platforms.

5. A drinking trough structure comprising a supporting frame, a rotatable pair of opposed drinking troughs, a supporting axis for the troughs comprising a hollow pipe or shaft having openings in position to discharge into the then lower trough, cover members active to the trough in service, movable platforms exterior to the troughs, and connections between the platforms and cover members for causing a movement of the cover members in one direction on the movement of the platform in the other direction.

6. A drinking trough structure comprising a supporting frame, a rotatable pair of opposed drinking troughs, a supporting axis for the troughs comprising a hollow pipe or shaft having openings in position to discharge into the then lower trough, cover members active to the trough in service, movable platforms exterior to the troughs, and connections between the platforms and cover members for causing a movement of the cover members in one direction on the movement of the platform in the other direction, the supporting structure having a locking means for holding the troughs in position.

7. In a drinking trough structure, a supporting frame, a plurality of rotatable troughs, and means for holding the troughs in adjusted positions comprising a hinged block shaped to engage a trough when in the lowermost position to hold it therein and movable on its hinge connection out of the path of the troughs.

8. In a trough structure, a supporting frame, a pair of troughs provided with end members extending from one trough to the other and carrying the troughs with the open side of one facing the open side of the other, and a support for the connected troughs intermediate thereof and about which the connected troughs may be rotated.

9. In a trough structure, a supporting frame, a rotatable pair of troughs in opposed relation one to the other, a central pivotal support for the troughs about which they may be rotated, cover members for the troughs mounted upon the pivot support, exterior platforms carried by the support, and movable with relation thereto, connected pulleys of different sizes for each platform, a cord connection from each platform to a respective pulley, and a cord connection from the other pulley of the set provided with readily detachable means for connection to either of the cover members, at will.

In testimony, that I claim the foregoing as my own, I have hereto affixed my signature in the presence of two witnesses.

JAMES D. SMITH.

Witnesses:
F. D. SILVER,
H. L. COLBOW.